Dec. 11, 1956  L. A. McCARTHY  2,774,051
ELECTRICAL UNIT
Filed Feb. 16, 1953  2 Sheets-Sheet 1

INVENTOR
L. A. McCARTHY
BY
ATTORNEY

Dec. 11, 1956 L. A. McCARTHY 2,774,051
ELECTRICAL UNIT
Filed Feb. 16, 1953 2 Sheets—Sheet 2
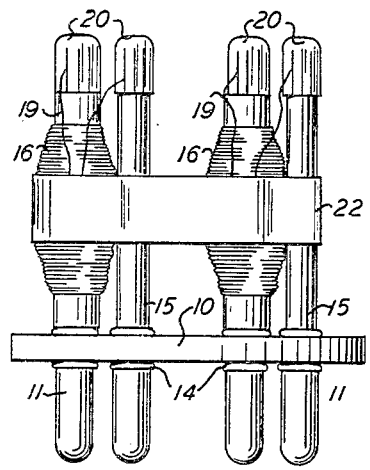
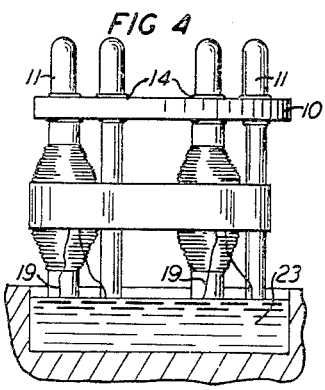
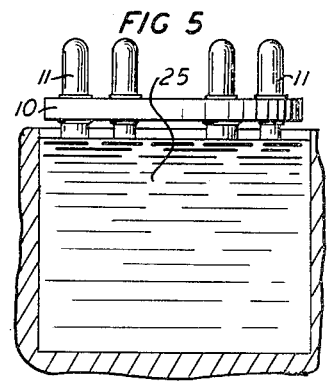
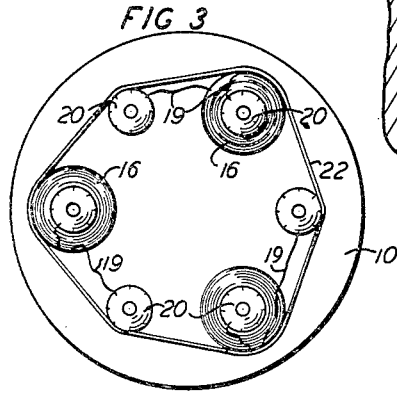
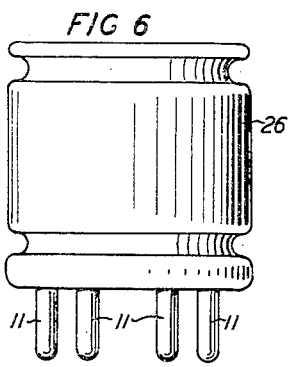
INVENTOR
L. A. McCARTHY
BY W. C. Parnell
ATTORNEY

United States Patent Office 2,774,051
Patented Dec. 11, 1956

2,774,051

ELECTRICAL UNIT

Lawrence A. McCarthy, Haverhill, Mass., assignor to Western Electric Company, Incorporated, New York, N. Y., a corporation of New York Application February 16, 1953, Serial No. 337,031

2 Claims. (Cl. 339—147)

This invention relates to electrical units particularly of the coil wound type.

In the manufacture of certain types of electrical units where hollow tubular elements mounted in dielectric bases provide the external electrical terminals for the internally mounted units, the various lead wires from the internal parts of the units have, in the past, been threaded through and connected by soldering to the tubular terminals, thus positioning these connections externally of the housings for the units and adjacent the portions which are subjected to disturbances during mounting of the units in their respective bases. Furthermore, in electrical units of this type, additional means is required to support the parts of the units in the housings and considerable care must be taken during the mounting of the parts and the threading of the lead wires into the terminals requiring also considerable time and material for the complete structures.

An object of the present invention is an electrical unit which may be assembled into a complete unit at low cost with the electrical connections disposed in the housing.

In accordance with the object of the invention, the electrical unit includes a dielectric base having spaced apertures therein through which terminals extend and are fixed intermediate their ends to the base. A core wound coil, having its leads exposed, is disposed on one of the terminals with means being provided to secure the leads respectively to the terminals.

Other objects and advantages will be apparent from the following detailed description when considered in conjunction with the accompanying drawings wherein:

Fig. 2 is a side elevational view of the partially completed electrical units.

Fig. 3 is a top plan view of the assembly shown in Fig. 2;

Fig. 4 is a vertical sectional view of a solder bath illustrating soldering of the caps and leads on the inner ends of the terminals;

Fig. 5 is a vertical sectional view of a sealing bath illustrating a sealing of the inner parts of the electrical unit, and Fig. 6 is a side elevational view of the completed resistance device.

Figure 1:
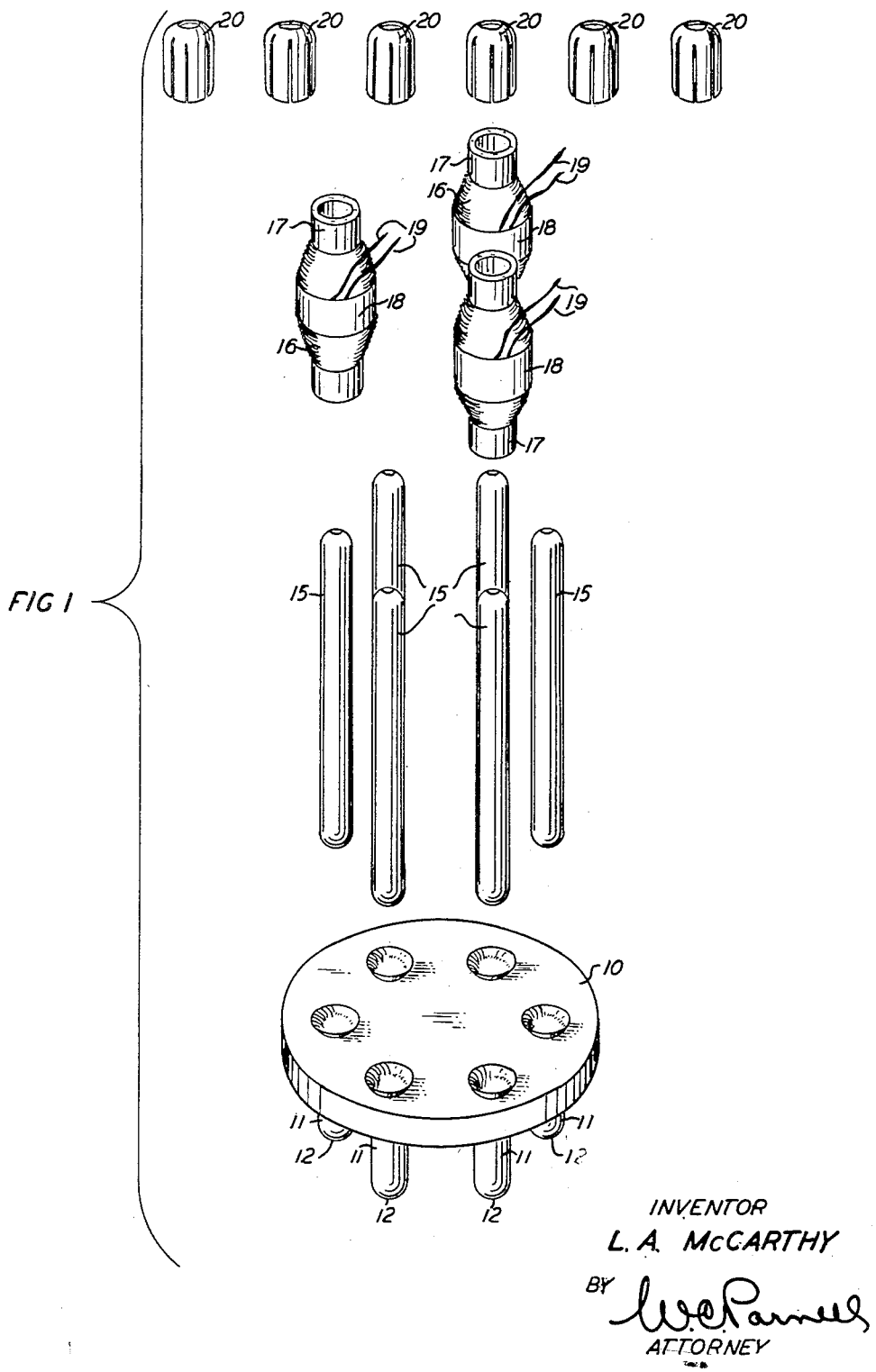
Fig. 1 is an exploded view of the electrical unit.

Referring now to the drawings, attention is first directed to the lower portion of Fig. 1 which illustrates a base 10 formed of suitable dielectric material and having a plurality of suitably spaced apertures therein to receive outer terminals 11. The outer terminals 11 are tubular, of the commercially known type, with rounded outer ends 12 and annular beads 14 at like positions intermediate the ends thereof. The beads 14 determine the positions of the terminals in the apertures of the base and after the lower terminals are disposed in their apertures, the upper ends thereof are flared outwardly by suitable means not shown. A series of like commercially available tubular inner terminals 15 as positioned with their lower ends nested in the flared open ends of the lower or outer terminals 11, after which, the outwardly flared ends are swaged inwardly causing positive mechanical and electrical connections between the respective outer and inner terminal portions to effectively complete terminals having outer and inner portions.

Coils 16 wound on dielectric cores 17 have inner diameters suitable for snug fit on their respective inner terminal portions 15. In the present instance the coils 16 are resistance coils of predetermined values and when finished, are provided with windings of paper or other suitable dielectric material 18 leaving their leads 19 free for attachment to their respective terminals. As one example, the coils may be placed on alternate terminals as illustrated in Figs. 2 and 3, leaving intermediate terminals free to receive the leads of their respective coils. Resilient mounting caps 20 are adapted to be disposed on the inner ends of the terminal portions 15, the caps having longitudinal slots therein whereby the leads 19 of the coils may be readily secured to their respective terminals. Furthermore, the caps are of certain lengths corresponding to the length of the tubes for the coils and the terminal portions 15, whereby certain of the caps, in addition to securing their respective leads to the terminals, serve to secure their respective coils against displacement. The assembly is secured temporarily by the aid of a tape 22 extending about the coils 16 and the intermediate terminals 15.

The species of electrical unit thus far assembled may be inverted and lowered partially into a solder bath 23 to solder the caps 20 on the ends of the terminal portions 15 and to secure also in this soldering operation the leads to their respective terminals and caps. If so desired, the soldering step may be preceded by a flux step including submerging the caps and the adjacent ends of the terminals 15 in a flux bath not shown. The partially completed assembly is partially submerged in a bath 25 of sealing compound to seal the assembly short of the dielectric base 10, after which a metal container or housing 26 is placed over the sealed portion of the device and secured in any suitable manner, such as by a spinning operation, to the base 10.

The electrical unit is readily assembled including two commercially known types of terminals assembled to produce a new type of terminal for rigid mounting, intermediate its ends in a dielectric base. The direct connections between the coils and the terminals are internally of the housing 26 while the terminals serve as the supporting means for the coils. The retaining elements or caps serve not only as quick and positive means for attaching the leads to their respective terminals, but also to secure the coils against displacement on their terminals. These assembly steps may be made readily, completing a unit which is free of the undesirable conditions which exists by following the old method steps.

Although the many other possible species of the invention are not shown, it is obvious from the species illustrated that the coils may be composed of different types of windings and that any selected group of coils may be mounted on the terminals, including more than one, of shorter lengths, on each terminal if so desired, and the leads of each coil connected to any selected pair of terminals.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An electrical unit comprising a dielectric base having pairs of spaced apertures therein, pairs of like terminals extending through the apertures of the base and fixed to the base intermediate their ends, a hollow electric device having leads exposed disposed on selected one of the terminals of each pair, and resilient clamping elements adapted to be mounted readily on like ends of the terminals to secure the electric devices and like leads thereof to the selected terminals simultaneously and to secure the other leads to the remaining respective terminals.

2. An electrical unit comprising a dielectric base having pairs of spaced apertures therein, pairs of like terminals extending through the apertures of the base and fixed to the base intermediate their ends, a hollow electric device having leads exposed disposed on selected one of the terminals of each pair, resilient clamping elements adapted to be mounted readily on like ends of the terminals to secure the electric devices and like leads thereof to the selected terminals simultaneously and to secure the other leads to the remaining respective terminals, and a layer of sealing compound substantially uniformly covering the electric devices, the clamping elements and the adjacent portions of the terminals.

References Cited in the file of this patent

UNITED STATES PATENTS

| 833,135 | Jacobson | Oct. 9, 1906 |
| 1,275,961 | Maynard | Aug. 13, 1918 |
| 1,533,292 | Woodson | Apr. 14, 1925 |
| 1,991,707 | Silbermann | Feb. 19, 1935 |
| 2,456,767 | Camras | Dec. 21, 1948 |
| 2,464,029 | Ehrman | Mar. 8, 1949 |
| 2,464,405 | Knauf | Mar. 15, 1949 |
| 2,513,965 | Pettit | July 4, 1950 |
| 2,531,085 | Stacey | Nov. 21, 1950 |
| 2,533,483 | Losquadro | Dec. 12, 1950 |
| 2,533,987 | Bahr | Dec. 12, 1950 |
| 2,558,798 | Thom | July 3, 1951 |
| 2,559,988 | Noyes, Jr. | July 10, 1951 |
| 2,627,008 | Dunlop | Jan. 27, 1953 |
| 2,638,660 | Van Gessel | May 19, 1953 |
| 2,649,558 | Franz | Aug. 18, 1953 |
| 2,677,118 | Stone | Apr. 27, 1954 |

FOREIGN PATENTS

| 126,224 | Australia | Dec. 24, 1945 |